United States Patent [19]

Saito et al.

[11] Patent Number: 4,708,885

[45] Date of Patent: Nov. 24, 1987

[54] MANUFACTURING METHOD FOR AN ELECTRONIC COMPONENT

[75] Inventors: Shigeki Saito, Fukui; Takao Hosokawa, Tsuruga; Masataka Mae, Fukui, all of Japan

[73] Assignee: Murata Manufacturing Co., Ltd., Kyoto, Japan

[21] Appl. No.: 932,567

[22] Filed: Nov. 20, 1986

[30] Foreign Application Priority Data

Nov. 22, 1985 [JP] Japan .................................. 60-263493

[51] Int. Cl.⁴ ............................................... B05D 5/12
[52] U.S. Cl. ...................................... 427/58; 428/421; 427/79; 228/180.2; 228/215
[58] Field of Search ................ 427/79, 58, 96; 428/421; 228/180.2, 214, 215

[56] References Cited

U.S. PATENT DOCUMENTS

| | | | |
|---|---|---|---|
| 2,710,266 | 6/1955 | Hochberg . | |
| 2,772,186 | 11/1956 | Mollers | 427/79 |
| 3,736,179 | 5/1973 | De Gier | 427/79 |
| 4,273,803 | 6/1981 | Johnk | 427/58 |
| 4,385,081 | 5/1983 | Keller | 427/79 |
| 4,505,982 | 3/1985 | Hoheisel | 428/421 |
| 4,511,076 | 4/1985 | Roth | 228/215 |

Primary Examiner—John D. Smith
Assistant Examiner—Vi Duong Dang
Attorney, Agent, or Firm—Wenderoth, Lind & Ponack

[57] ABSTRACT

A manufacturing method for an electronic component connected at a lead terminal thereof to electrodes at an element so that the element is coated at the surface with an over-coat resin, which prevents the lead terminal from being unnecessarily coated with the over-coat resin, thereby improving the automatic insertion efficiency of the electronic component with respect to a printed circuit board.

An intermediate portion of the lead terminal positioned at the outer peripheral edge of the element is previously applied with a repellent against the over-coat resin, the lead terminal being mounted on the element and thereafter the element being dipped into the over-coat resin, so that the over-coat resin, when coated on the element, is prevented from adhering to the portion of lead terminal applied with the repellent, thereby avoiding creation of running of the over-coat resin at the lead terminal.

3 Claims, 14 Drawing Figures

MANUFACTURING METHOD FOR AN ELECTRONIC COMPONENT

The present invention relates to a manufacturing method for an electronic component, and more particularly to a manufacturing method for an electronic component comprising an element and terminals projecting therefrom, the element being dip-coated at the surface with an over-coat resin.

The conventional electronic component, such as a ceramic capacitor, is so constructed that a disc-like element of ceramic or the like is provided at both surfaces with electrodes, lead terminals are soldered to both the electrodes, and the element is dipped into the dissolved over-coat resin, so that the over-coat resin is coated on the outer surface of the element and then cured.

Figure 1A:
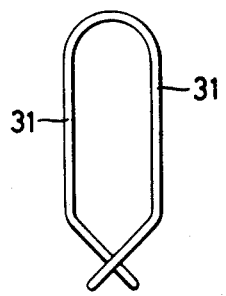
Figure 1B:
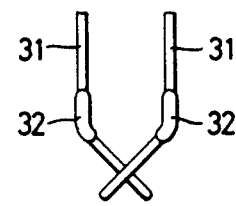
Figure 1C:
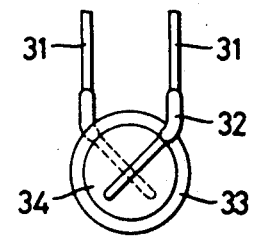
Figure 1D:
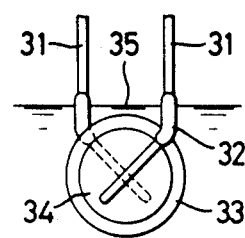
Figure 1E:
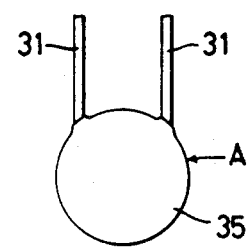
Figure 2A:
Figure 2B:
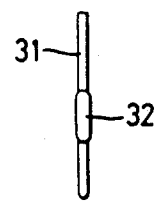
Figure 2C:
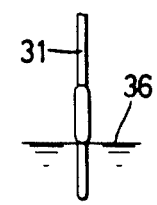
Figure 2D:
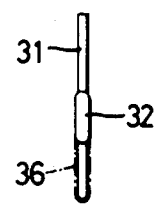
Figure 2E:
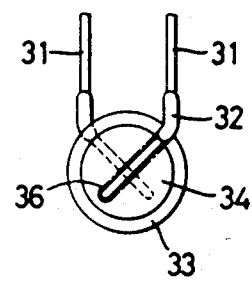
Figure 3:
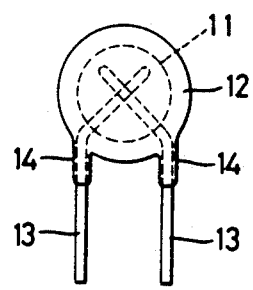

In the conventional electronic component, as shown in FIG. 3, an insulating over-coat resin 12 applied on the outer surface of an element 11 causes running 14 at a portion of each lead terminal 13.

The reason for the above is that the element 11, when dipped into the resin, should be applied fully therewith, thereby dipping part of the lead terminal too into the resin.

In a case that the running 14 at the electronic component is long as above-mentioned, when the lead terminals are inserted into lead terminal insertion bores 16 at a printed circuit board 15, the over-coat resin at its running 14 is peeled off so as to deteriorate the quality of a product, or when the running 14 enters into each bore 16, the over-coat resin can not be soldered to cause a poor solderability.

Figure 5:
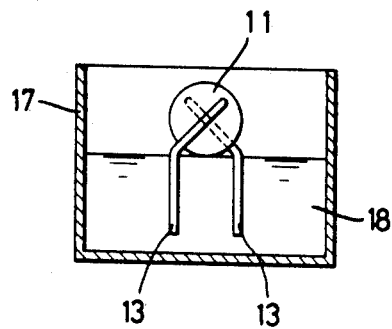
Figure 6:
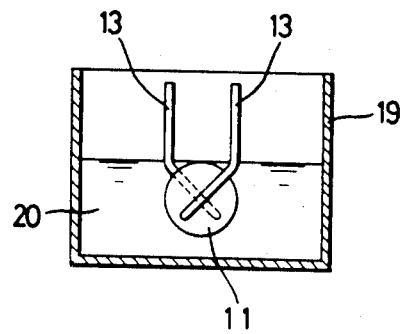

In order to solve the above problems, there is a method that, as shown in FIG. 5, at first the lead terminals 13 soldered to the element 11 are dipped into a desired repellent 18, such as wax or paraffin which acts to repel the over-coat resin and filled in the molten state in a tank 17, and thereafter taken out therefrom. Next, the element 11, as shown in FIG. 6, is dipped into the dissolved over-coat resin 20 filled in a tank 19 so as to be coated with the over-coat resin 20, and then taken out from the tank 19.

In such method, however, when the repellent 18 is stuck to part of the element 11 during the dipping of the lead terminals 13 into the repellent 18, the over-coat resin 20, when applied on the element 11, does not adhere to the part of element 11 onto which the repellent is stuck, thereby creating the problem in that a defective product exposed in part of the element 11 is obtained.

In order to solve the above problem, the present invention has been designed.

An object thereof is to provide a manufacturing method for an electronic component which avoids creation of running of the over-coat resin at each lead terminal even when the element is applied with the over-coat resin.

Another object of the invention is to provide a manufacturing method for an electronic component, which can prevent each lead terminal from casuing running of the over-coat resin and simultaneously ensure coating thereof on the outer surface of the element.

Still another object of the invention is to provide a manufacturing method for an electronic component, which can avoid detorioration in quality of the component when mounted the printed circuit board and ensure the solderability thereto.

These and other objects and features of the invention will be more apparent in detail upon a reading of the following description with reference to the accompanying drawings.

FIGS. 1-(a) through -(e) are front views of an embodiment of a manufacturing method for an electronic component of the invention, which shows the processes in order, FIGS. 2-(a) through -(e) are front views of a modified embodiment of the invention, which shows the processes in order.

Figure 4:
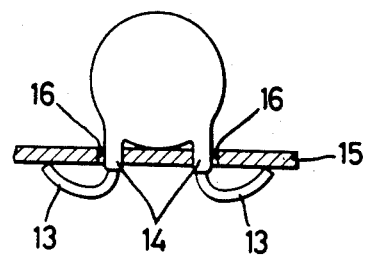

FIG. 3 is a front view of an electronic component manufactured by the conventional method, FIG. 4 is a front view exemplary of the electronic component in FIG. 3 mounted on a printed circuit board, and FIGS. 5 and 6 are longitudinally sectional views showing the conventional method of coating the over-coat resin on the electronic component.

In an embodiment of the invention shown in FIG. 1, a lead terminal 31 is formed of a U-like-shaped metal wire and at first bent at both ends toward each other and crossed in a X-like shape as shown in FIG. 1-(a).

Next, the bent portions of the lead terminal 31 and in the vicinities thereof are applied with a repellent 32, such as fluorocarbon resin, of small surface tensions as shown in FIG. 1-(b).

Thereafter, an element 33 provided at both sides with electrodes, as shown in FIG. 1-(c), is put between both the utomost ends of X-like-shaped lead terminals 31, at which time the repellent 32 is allowed to be positioned at the outer peripheral edge of element 33. Then, the lead terminal 31 are soldered at both ends thereof to the electrodes 34 provided at both surfaces of the element 31. In this case, the soldering heat melts the repellent 32 to spread it on the surfaces of lead terminals 31.

Next, as shown in FIG. 1-(d), the element 33 is dipped in a liquid over-coat resin 35 and coated on the entire surface therewith. Thereafter, the element 33 is taken out from the over-coat resin 35 and the resin is cured, thereby obtaining an electronic component of no running of the over-coat resin as shown in FIG. 1-(e).

In addition, the repellent 32 applied onto each lead terminal 31 is removed therefrom by the heat generated when the over-coat resin 35 is cured.

Referring to FIG. 2, a modified embodiment of the invention is shown. At first, a straight lead terminal 31 as shown in FIG. 2-(a) is applied at its required portion with the repellent 32 as shown in FIG. 2-(b). Thereafter, the lead terminal 31 is dipped at the tip thereof in preliminary molten solder 36 as shown in FIG. 2-(c), the solder 36 being attached to the end of the lead terminal 31.

Incidentally, in FIGS. 2-(a) through -(d), only one lead terminal 31 is shown, but actually two lead terminals 31 are of course used.

Then, each lead terminal 31 applied at the utmost end with the preliminary solder 36 and repellent 32 is bent, and two bent lead terminals 31 are X-like-crossed and put therebetween the element 33.

Next, the element 33 put between the lead terminals 31 is heated to remelt the preliminary solder at the utmost end of each lead terminal 31 to thereby solder the element 33 with each lead terminal 31.

In the modified embodiment, it is interesting that the position where the repellent 32 previously applied on the lead terminal 31 is formed, is controllable when the lead terminal 31 is dipped into the preliminary solder, whereby the repellent 32 is applied always at the predetermined position on each lead terminal 31. In detail, when the lead terminal 31 is dipped into the preliminary solder 36, the repellent 32 is intended to spread on the surface of lead terminal 31, but a difference in specific gravity between the solder 36 and the repellent 32 prevents the molten repellent 32 from entering into the molten solder 36, thereby keeping the repellent 32 always above the level of the solder 36. In brief, the position where the repellent 32 is formed is lastly decided by a depth of dipping the lead terminal 31 into the solder 36. Even if the repellent 32 is applied too near the tip of lead terminal 31, when the lead terminal 31 is dipped into the solder 36, the molten repellent 32 is raised from the level of solder 36 so as to be coated on the surface of the lead terminal above the level of solder 36.

Thereafter, as the same as the embodiment in FIG. 1, the element 33 is dipped into the liquid over-coat resin and taken out therefrom to thereby cure the over-coat resin to obtain an electronic component. In this case, the repellent 32 also is removed during the curing the over-coat resin.

Thus, the repellence effect to the over-coat resin when coated is improved so as to prevent the over-coat resin from adhering to the lead terminal 31 and simultaneously the over-coat resin 35 is completely applied to the element 33.

In addition, it is preferable to use the repellent, such as fluorocarbon resin, of small surface tension, of heat resistance, and not decomposable, for example, in the soldering condition (350° C., 5 sec or less).

As seen from the above, the manufacturing method of the invention for the electronic component comprising the element, such as the ceramic capacitor, coated at the surface with the insulating over-coat resin and the lead terminals projecting from the applied over-coat resin, can prevent part of over-coat resin from extending to the lead terminal to form running of over-coat resin, thereby eliminating various defects caused by the running of over-coat resin at the conventional electronic component and largely improving the quality thereof.

Accordingly, when the electronic component manufactured by the method of the present invention is mounted on the printed circuit board, there is no fear of causing peeling of the running of over-coat resin, thereby remarkably improving the solderability for the printed circuit board.

Although several embodiments have been described, they are merely exemplary of the invention and not to be constructed as limiting, the invention being defined solely by the appended claims.

We claim:

1. A method of manufacturing an electronic component provided with lead terminals attached to an electrode in said electronic component, said electronic component being coated with an overcoat resin, which comprises dipping lead terminals into a repellent against the overcoat resin such that the repellent is coated on the lead terminals at a predetermined distance from the center and end of said lead terminals, dipping the end portion of the lead terminals into a preliminary solder so that the end portions are coated with the solder up to the location of the repellent coating, abutting the lead terminal coated with the preliminary solder and repellent against the electronic component such that the preliminary solder portion of the lead terminals is positioned against the electrode of the electronic component and the repellent coated portion is located at the outer peripheral edge of the electronic component, respectively, remelting the preliminary solder so as to solder the lead terminal to the electrode and dipping the entire electronic component into an overcoat resin so that the overcoat resin adheres to the entire surface of the electronic component, including the exposed lead terminals.

2. A method according to claim 1, wherein the lead terminal is formed of one metal wire bent in a U-like shape, so that both ends thereof are bent toward each other and crossed in an X-like shape, both said bent portions being coated with a repellent.

3. A method according to claim 1, wherein said repellent contains a fluorocarbon material which is not decomposable during the soldering of the lead wires to the electronic component.

* * * * *